United States Patent
Rosu et al.

(10) Patent No.: US 11,789,118 B2
(45) Date of Patent: Oct. 17, 2023

(54) CALIBRATION OF A PHASED ARRAY

(71) Applicant: NXP USA, Inc., Austin, TX (US)

(72) Inventors: Filip Alexandru Rosu, Bucharest (RO); Tudor Bogatu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 546 days.

(21) Appl. No.: 17/139,480

(22) Filed: Dec. 31, 2020

(65) Prior Publication Data
US 2022/0128654 A1    Apr. 28, 2022

(30) Foreign Application Priority Data

Oct. 23, 2020   (RO) .............................. a 2020 00666

(51) Int. Cl.
| | | |
|---|---|---|
| *G01S 7/40* | (2006.01) | |
| *H01Q 3/26* | (2006.01) | |
| *G06F 17/16* | (2006.01) | |
| *G06F 17/14* | (2006.01) | |

(52) U.S. Cl.
CPC .......... *G01S 7/4021* (2013.01); *H01Q 3/267* (2013.01); *G06F 17/142* (2013.01); *G06F 17/16* (2013.01)

(58) Field of Classification Search
CPC .......... G01S 2013/0245; G01S 7/4021; G06F 17/142; G06F 17/16; H01Q 3/267
See application file for complete search history.

(56) References Cited

U.S. PATENT DOCUMENTS

| | | |
|---|---|---|
| 6,771,216 B2 | 8/2004 | Patel et al. |
| 7,199,753 B2 | 4/2007 | Pauplis |
| 7,714,775 B2 | 5/2010 | Navarro et al. |
| 8,199,048 B1 | 6/2012 | Medina Sanchez |
| 9,331,751 B2 | 5/2016 | Sikina et al. |
| 9,360,549 B1* | 6/2016 | Liu .............. G01S 7/4026 |
| 2003/0038747 A1 | 2/2003 | Patel et al. |
| 2020/0389285 A1* | 12/2020 | Nuimura ........... G01R 29/10 |
| 2021/0257730 A1* | 8/2021 | Ma ............. H04B 7/086 |

OTHER PUBLICATIONS

G. Babur et al., "Simple Calibration Technique for Phased Array Radar Systems," Progress In Electromagnetics Research M, vol. 55, pp. 109-119, Mar. 23, 2017.
P. Cherntanomwong et al., "Array Calibration using Measured Data for Precise Angle-of-Arrival Estimation," IWS 2005/WPMC'05—Aalborg, Denmark, pp. 456-460, Sep. 18-22, 2005.

(Continued)

*Primary Examiner* — Timothy A Brainard

(57) ABSTRACT

An already deployed phased array can be calibrated in the near field without the need for an anechoic chamber or complex positioning mechanisms. Calibration includes positioning a transmitting antenna in the near field in front of the receiving antennas and generating range profiles while the transmitting antenna is positioned at various locations. The range profiles are utilized to produce various defined vectors that are then used in calculations that output a coupling calibration matrix and two vectors that compensate for receiver channel length and gain differences. The coupling calibration matrix and the vectors are input into the processing unit of the phased array in order to calibrate the receiving channels relative to each other.

20 Claims, 12 Drawing Sheets

(56) References Cited

OTHER PUBLICATIONS

C. Fulton et al., "Calibration Techniques for Digital Phased Arrays," 2009 IEEE International Conference on Microwaves, Communications, Antennas and Electronics Systems, Tel Aviv, 10 pages, Nov. 9-11, 2009.

F. Rosu et al., "Low-Cost S-Band FMCW Radar-Based Short-Range Displacement Sensor," 2018 International Conference on Communications (COMM), Bucharest, pp. 251-256, Jun. 2018.

Z.N. Chen et al., "Handbook of Antenna Technologies," pp. 242-251, Copyright Springer Science+Business Media, Singapore, 2016.

* cited by examiner

CALIBRATION OF A PHASED ARRAY

TECHNICAL FIELD

The present disclosure relates in general to phased array systems, and in particular, to calibration of a receiving phased array.

BACKGROUND

A phased array is an array of transmitting or receiving elements, such as antennas, speakers, or microphones. By utilizing multiple elements, the array is capable of spatially restricting the transmission or reception of signals. Further, adjusting the phase or time delays to these elements enables beam steering, in which the direction of greatest sensitivity or radiation can be aimed. Phased arrays depend on the wave-like nature of the radiation transmitted and received, be it radio frequencies, sound, or light. For receiving arrays, one can steer the direction of sensitivity in a similar fashion. When the signal is received, a phase or time delay can be applied incrementally between receivers. When the set of delays is "aligned" with the direction of the signal, the sum of the received inputs is the strongest. The simplest phased arrays are linear. That is, elements are placed along a line with equal spacings between elements.

Phased arrays play a very important role in modern radar and wireless communication systems. Radar systems, such as those mounted on automobiles and other transportation devices, take advantage of the beam steering and spatial filtering capabilities of phased arrays. Using electronically adjustable phase or time delay generators, beam steering can be accomplished without the need for mechanical assemblies, which can be cumbersome and slow, and spatial filtering allows for both localization and determination of detected objects.

Due to some inevitable errors and uncertainties, such as imprecise mechanical manufacturing tolerances, temperature variations, and electronic and radio frequency ("RF") component aging, the realistic array element excitation (both amplitude and phase) can deviate from their ideal values. This would cause array radiation pattern distortion and degrade the overall performance, which must be carefully considered for practical system design. Hence, to maintain an acceptable performance of a phased array, calibrations may be necessary before and/or during their operation.

However, traditionally such calibrations necessitate the use of an anechoic chamber, the requirement of dismounting the array if re-calibration is needed, and the requirement of highly precise positioning mechanisms.

BRIEF DESCRIPTION OF THE DRAWINGS

FIG. 6 illustrates a plot of range variation between a transmitting antenna and each receiving antenna.

DETAILED DESCRIPTION

Figure 1:
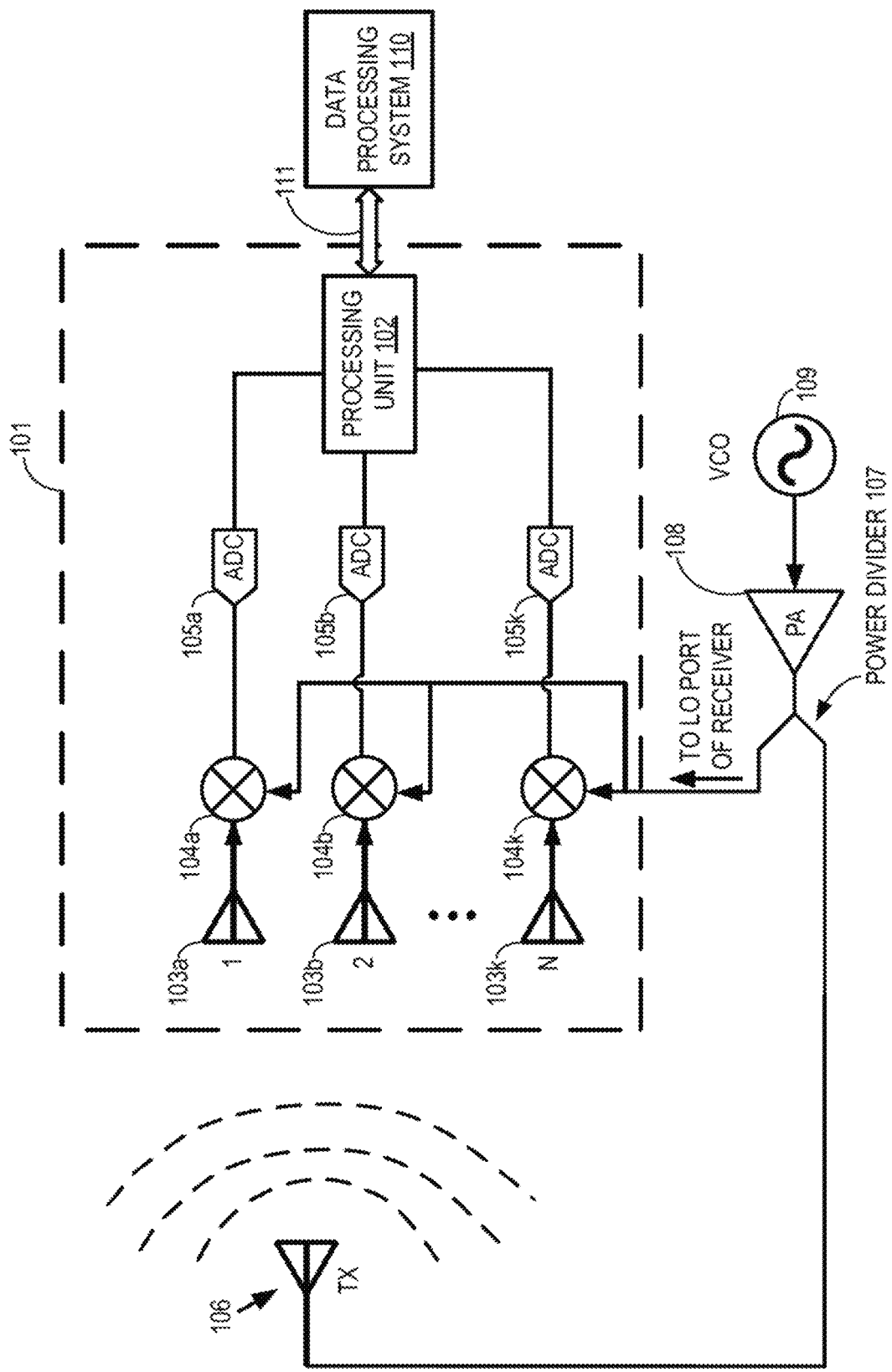
FIG. 1 illustrates a simplified schematic diagram of the basic set up arrangement for calibrating a phased array in accordance with embodiments of the present disclosure.

Embodiments of the present disclosure provide a technique for calibrating a receiving phased array system, such as may be utilized in commercial or defence applications (e.g., automotive radar systems, wireless broadband communications, aircraft tracking radars, etc.). Embodiments of the present disclosure can be utilized to calibrate an already deployed phased array (e.g., mounted on its host device) in the near field without the need for an anechoic chamber or complex positioning mechanisms, which are difficult or impossible to deploy in the field. Note that there are three spatial regions in which the phased array behaves very differently. The first is the reactive near field, the region closest to the phased array, defined as the region where the reactive field dominates the radiated field (i.e., the E and H fields are out of phase by 90 degrees to each other), and is upper bound by the distance $$0.62\sqrt{\frac{D^3}{\lambda}},$$

where D is the physical aperture length (maximum linear dimension of the antenna) and $\lambda$ is the operating wavelength. This region of operation is of no interest for both normal operation of the phased array and for calibration purposes. The second region is the radiative near field, or simply near field, defined as the region where the radiated field dominates the reactive field. It is lower bound by $$0.62\sqrt{\frac{D^3}{\lambda}}$$

and upper bound by $$\frac{D^2}{\lambda}.$$

In this region, the wave fronts are spherical, and thus avoided for normal operation of the phased array due to spherical aberration phase distortion. The third region is the far-field region, and is the region where most radar and communication systems operate. It is defined at distances greater than $$\frac{D^2}{\lambda}$$

from the phased array. Similar to the near-field region, radiated fields dominate the reactive fields, the principle difference being that the wave front can be approximated as planar. This region is also ideal for calibration; however, it requires extremely large anechoic chambers and extremely precise positioning systems, and thus rarely used for calibration purposes. Embodiments of the present disclosure offer a solution to this problem by allowing calibration in the near field while correctly dealing with the spherical aberration caused by the spherical wave fronts.

Embodiments of the present disclosure can utilize the already existing hardware components of the phased array under test, such as the down conversion mixers, local oscillator ("LO") output, voltage controlled oscillator ("VCO") or digitally controlled oscillator ("DCO"), and analog-to-digital converters ("ADCs"), allowing the calibration to be accomplished without dismounting the array (e.g., from the host device). By using radar techniques, embodiments of the present disclosure provide for multi-path mitigation and are also capable of correcting the spherical aberration of the wave-front caused by the near field measurements. Calibration in accordance with embodiments of the present disclosure involves connecting a transmitting antenna to the LO output port of the phased array (e.g., via a coaxial cable), such that the transmitting antenna may be pointed towards the phased array at multiple angles (effectively utilizing a bistatic radar scenario). Once calibration is complete, the phased array will be fully calibrated, including for possible range measurement errors caused by coupling between antennas, signal trace length mismatches, and phase and gain mismatches. A monostatic system may also be used for smaller arrays. Bistatic radar is a radar system in which a transmitting source and receiving element are separated by a distance comparable to the expected target distance. Conversely, a radar in which the transmitting source and receiving element are collocated is referred to as a monostatic radar.

Embodiments of the present disclosure utilize an auto-calibration technique, which eliminates the requirement for knowing the position of the transmitting source and the radiation pattern of the receiving elements, and implements range compression, which offers the possibility of multi-path mitigation. Embodiments of the present disclosure can work both with taking near-field measurements and far-field measurements. Far-field measurements are implemented by placing a transmitting source at a relatively large distance from the receiving array, which is rarely possible in practice. Conversely, near-field measurements are affected by spherical aberrations, and thus typically require highly precise optical measurement or positioning devices. However, embodiments of the present disclosure can utilize near-field measurements without the need for any of such complex measurement or positioning devices.

A calibration procedure for a receiving phased array differs from that of a transmitting phased array. The signal that becomes coupled between antennas in a receiving phased array is an impending wave, which becomes partially absorbed by the antenna elements and re-radiated. For a transmitting array, the signal that becomes coupled is the signal that is being transmitted by one of the antenna elements, hence requires a different mathematical model. An example would be the difference of two simplistic approaches, the Receiving Mutual Impedance method used for receiving phased arrays and the Z impedance method used for transmitting phased arrays. Embodiments of the present disclosure pertain to receiving phased arrays. Referring to FIG. 1, there is illustrated a simplified schematic diagram of the basic set up arrangement for calibrating a phased array 101 in accordance with embodiments of the present disclosure. Such a phased array may be implemented in a host device, such as for radar systems utilized in vehicles. The phased array 101 may be implemented with N (where N>1) receiving elements (e.g., antennas) 103a . . . 103k. Each receiving antenna 103a . . . 103k may be coupled to a respective down conversion mixer 104a . . . 104k and a respective ADC 105a . . . 105k having outputs coupled to a processing unit 102 (e.g., microprocessor, microcontroller, system-on-a-chip ("SOC")), which runs one or more software programs/algorithms configured to calculate range measurements pertaining to one or more objects detected by the phased array as a function of the digital signals output from the ADCs 105a . . . 105k. (Note that the entire assembly from the output port of the receiving antenna to its respective ADC is also referred to herein as the receiver channel.)

In the case of a phased array used as a radar, during normal operations of the radar phased array (which may be referred to herein as the radar mode), each of the receiving antennas 103a . . . 103k receives an EM signal reflected from an object in order for the Angle of Arrival ("AoA") between the phased array and the object to be determined. In general, the received EM signals are converted by each receiving antenna into an RF signal, which is then processed by the down conversion mixer and converted to a digital signal by the ADC. It is these range estimates that are then utilized by signal processing components and/or algorithms (i.e., within the processing unit 102) to calculate and output a range measurement from the phased array 101.

However, during calibration of the phased array 101 performed in accordance with embodiments of the present disclosure (which may be referred to herein as the calibration mode), a transmitting source (e.g., antenna) 106 will be positioned in the near field oriented/pointed towards the receiving antennas 103a . . . 103k (i.e., so that the RF waves are transmitted towards the receiving antennas) in a manner as described with respect to FIGS. 2-6. In systems (e.g., radar systems) in which the transmitting antenna is detachable, typically such a transmitting antenna is coupled to the system via a coaxial feedline or waveguide. Such a coaxial feedline or waveguide, or a separate or additional coaxial cable of some suitable length may be utilized so that the transmitting antenna can be oriented to transmit towards the receiving antennas at multiple angles as described herein. In systems (e.g., radar systems) in which the antennas are implemented on a printed circuit board ("PCB"), before the systems are commercially manufactured, a calibration PCB may be fabricated that implements receiving antennas, receiving antennas signal feedlines, and other integrated circuitry (e.g., for the mixers, ADCs, etc.) that are substantially identical in design and configuration to the commercially manufactured version, except that the RF output port is connected to a port instead of a printed transmitting antenna so that a separate transmitting antenna can be oriented in the manner as described herein. The transmitting antenna 106 may receive its signal to be transmitted from a VCO 109 through a power amplifier ("PA") 108. If the phased array under test includes a VCO and/or PA, these can be utilized; otherwise, a separate VCO and PA may be added for the purposes described herein. This transmitted signal is also sent to the LO port of the phased array 101 via a power divider 107. Embodiments of the present disclosure may utilize the phased array 101 as a frequency-modulated continuous-wave radar ("FMCW") radar.

Note that, in accordance with embodiments of the present disclosure, the calibration procedure does not require that the lengths of the receiver channels between each of the receiving antennas 103a ... 103k and their respective down conversion mixers 104a ... 104k and ADCs 105a ... 105k be matched with each other. Neither do the gains of the receiving antennas 103a ... 103k or the gains of the receiver channels. The signals fed to the LO ports of the down conversion mixers 104a ... 104k have the same phase among all receiver channels, and the sampling rates of the ADCs 105a ... 105k are synchronous.

Calibration of the phased array 101 may be performed by a data processing system 110 coupled to digital input/output ports of the phased array 101 by a suitable data connection 111. The data processing system 110 is configured with a software program that performs the calibration calculations described herein with respect to Equations (2)-(17). For example, during the calibration mode of the phased array 101, the digitized signals produced by each of the ADCs 105a ... 105k are transmitted (for example, via a suitable bus or signal connection (e.g., ethernet) 111 to the data processing system 110, where they are processed to extract information regarding the phased array 101 utilized to generate channel trace length and gain compensation vectors and a coupling calibration matrix as described herein. The channel trace length and gain compensation vectors and the coupling calibration matrix are then provided from the data processing system 110 over the data connection 111 to be stored into a memory of the processing unit 102. The processing unit 102 then uses the channel trace length and gain compensation vectors and the coupling calibration matrix to correct the output signals from each of the ADCs 105a ... 105k during the radar mode operation of the phased array 101.

Once an EM signal, s(t), has been received by a receiving antenna 103a ... 103k, it is mixed by its corresponding down conversion mixer 104a ... 104k with the current output of the VCO 109, which has been fed into the local oscillator port of the down conversion mixer 104a ... 104k: $LO(t)=s(t-t_i)$. The intermediate frequency ("IF") signal is the "difference" component of the product, and is of the form as presented in Equation (1):

$$s_b(t) = A\cos\left(2\pi \frac{B}{T}\frac{R}{c}t + 2\pi\frac{R}{\lambda} - \pi\frac{B}{T}\left(\frac{R}{c}\right)^2 + \varphi_{target}\right) \cong \\ A\cos\left(2\pi \frac{B}{T}\frac{R}{c}t + 2\pi\frac{R}{\lambda} + \varphi_{target}\right) \quad (1)$$

where A represents the amplitude of the transmitted signal received by the receiving antenna, B represents the chirp bandwidth of the transmitted signal, T represents the chirp duration of the transmitted signal, λ represents the wavelength of the transmitted signal, t represents time, c represents the speed of light, R represents the range from the transmitting antenna 106 to the receiver, and $\varphi_{target}$ represents the phase shift produced by the electromagnetic reflections phenomenon, which depends upon target geometry and shape (though its value is not relevant to embodiments of the present disclosure).

The frequency of $s_b(t)$, also referred to as the beat frequency, is linearly dependent on the range (i.e., distance) between a receiving antenna 103a ... 103k and the transmitting antenna 106. Taking the Fourier Transform of $s_b(t)$ will result in the range profile. The range profile is a two-dimensional plot, where on the x-axis is the range, and on the y-axis is the signal amplitude coming from targets at that particular range.

Suppose there is a large spectral component of the range profile at frequency $f_i$; this corresponds to a detection at a range $$R_i = \frac{T}{B}\frac{c}{2}f_i.$$

Each detection will manifest as a peak at range $R_i$, having a 3 dB width of $$\frac{c}{2B}.$$

This is known as the range resolution, δr, and represents a measure of how well targets can be spatially separated. By selecting δr such that the difference between the line of sight and the shortest multipath is greater than δR, multipath will have zero effect on calibration. Multipath refers to a summation of waves that arrive at the receiving antenna at different times due to their different paths. Multipath interference causes undesired changes in the received signal, such as amplitude variations, and frequency and phase shifts. By range compressing the signal, the signal-to-noise ("SNR") is also increased by a factor proportional to the number of available time-domain samples.

Figure 2:
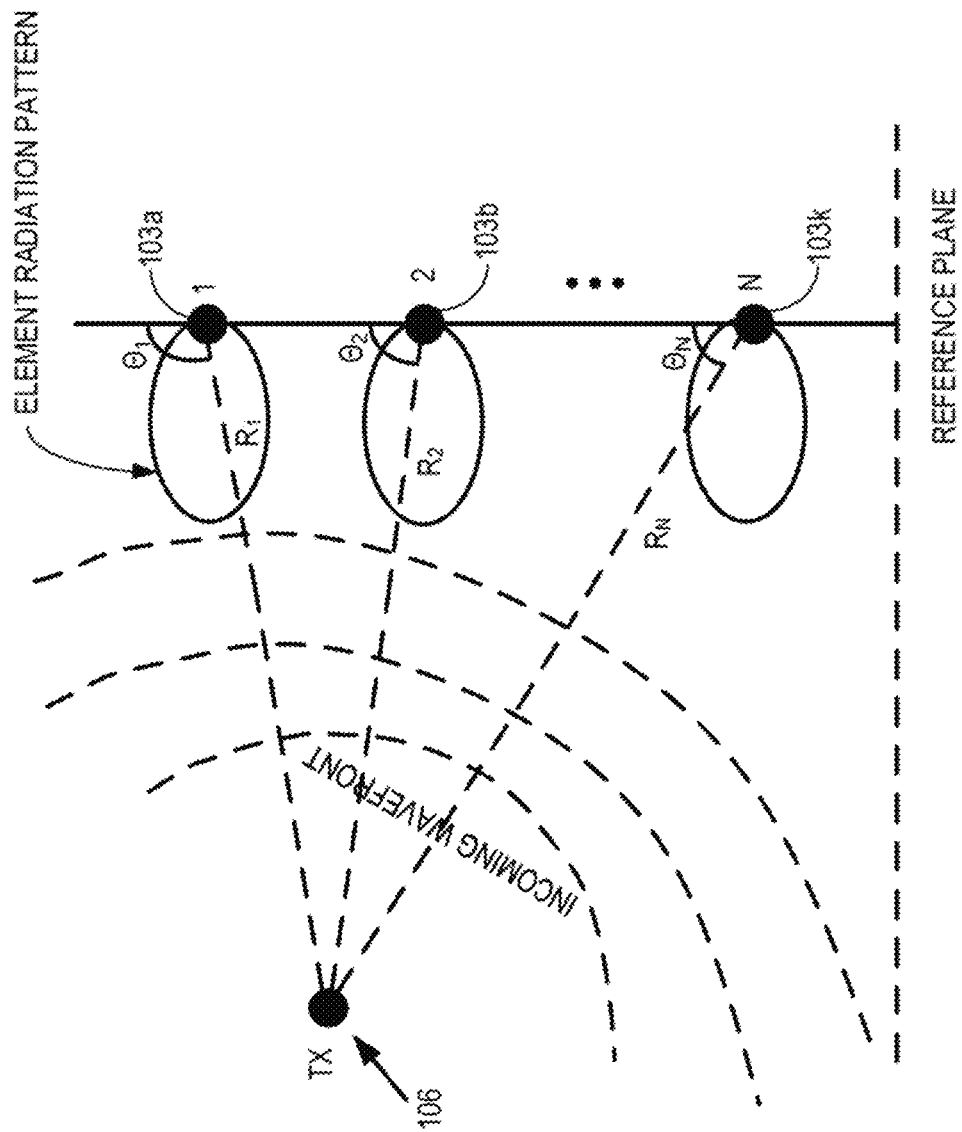
FIG. 2 illustrates a near-field calibration scenario, where the spherical nature of the transmitted wave front received by receiving antennas is depicted.

As previously noted, embodiments of the present disclosure calibrate a phased array 101 by positioning of a transmitting antenna in the near field. A near-field calibration scenario is illustrated in FIG. 2, which also depicts the spherical nature of the incoming wave fronts of the transmitted EM signal to the receiving antennas 103a ... 103k. A problem with such a near-field calibration scenario is that each receiving antenna sees a different angle of arrival of the incoming EM signal. In order to correctly estimate the phase-shifts between each receiving antenna, the range from each receiving antenna 103a ... 103k to the transmitting antenna 106 must be known. The range can either be found using specialized optical systems and positioning mechanisms or, as presented in this disclosure, by analysing the range profile.

The following notations are utilized within this disclosure (where k≤N):

$R_k$ represents the distance between the transmitting antenna 106 and the $k^{th}$ receiving antenna.

$r_k$ represents the distance of the receiver channel signal path from the output port of the $k^{th}$ receiving antenna to its respective ADC.

Due to undesired effects such as caused by the mutual couplings between the receiving antennas 103a ... 103k and/or deterministic differences in the lengths of the receiver channel signal paths, range estimations from one or more of the receiver channels can become inaccurate, which will adversely affect the calculations of the range measurements performed within the processing unit 102, which can naturally adversely affect the accuracy and performance of a host device relying upon such range measurements. In order to address these issues, phased array range measurements are modelled as presented in Equation (2):

$$z = (C(x \odot A)) \odot g \odot \exp\left(j2\pi\frac{r}{\lambda}\right) \quad (2)$$

where z represents performance of the phased array for radar-mode measurements made with respect to each of the receiving antennas, C represents an N×N coupling matrix that takes into account mutual coupling between receiving antennas, ⊙ represents performance of a point-wise or Hadamard product, A represents the signal gain for each receiving antenna element, g represents differences in signal gains between the receiver channels, and r represents the differences in the lengths between each receiver channel signal path. In accordance with embodiments of the present disclosure, the calibration procedure effectively transforms the range measurements z into x, where x represents ideal range measurements (i.e., the received range measurements output from each ADC 105a . . . 105k unaffected by antenna couplings, channel signal length mismatches, etc.).

Figure 7A:
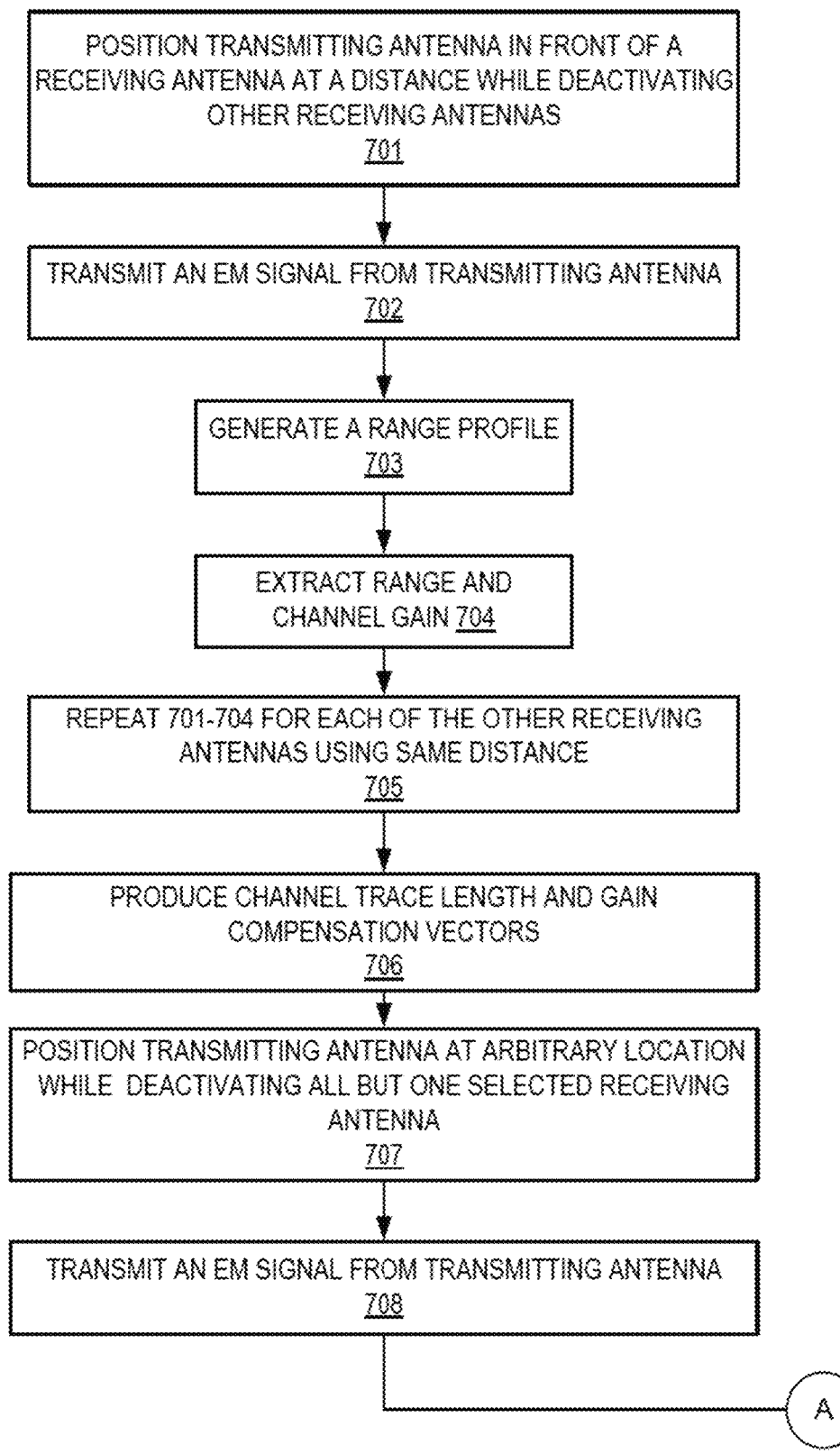
FIGS. 7A-7B illustrate a flowchart diagram of a system and process for calibrating a phased array in accordance with embodiments of the present disclosure.
Figure 7B:
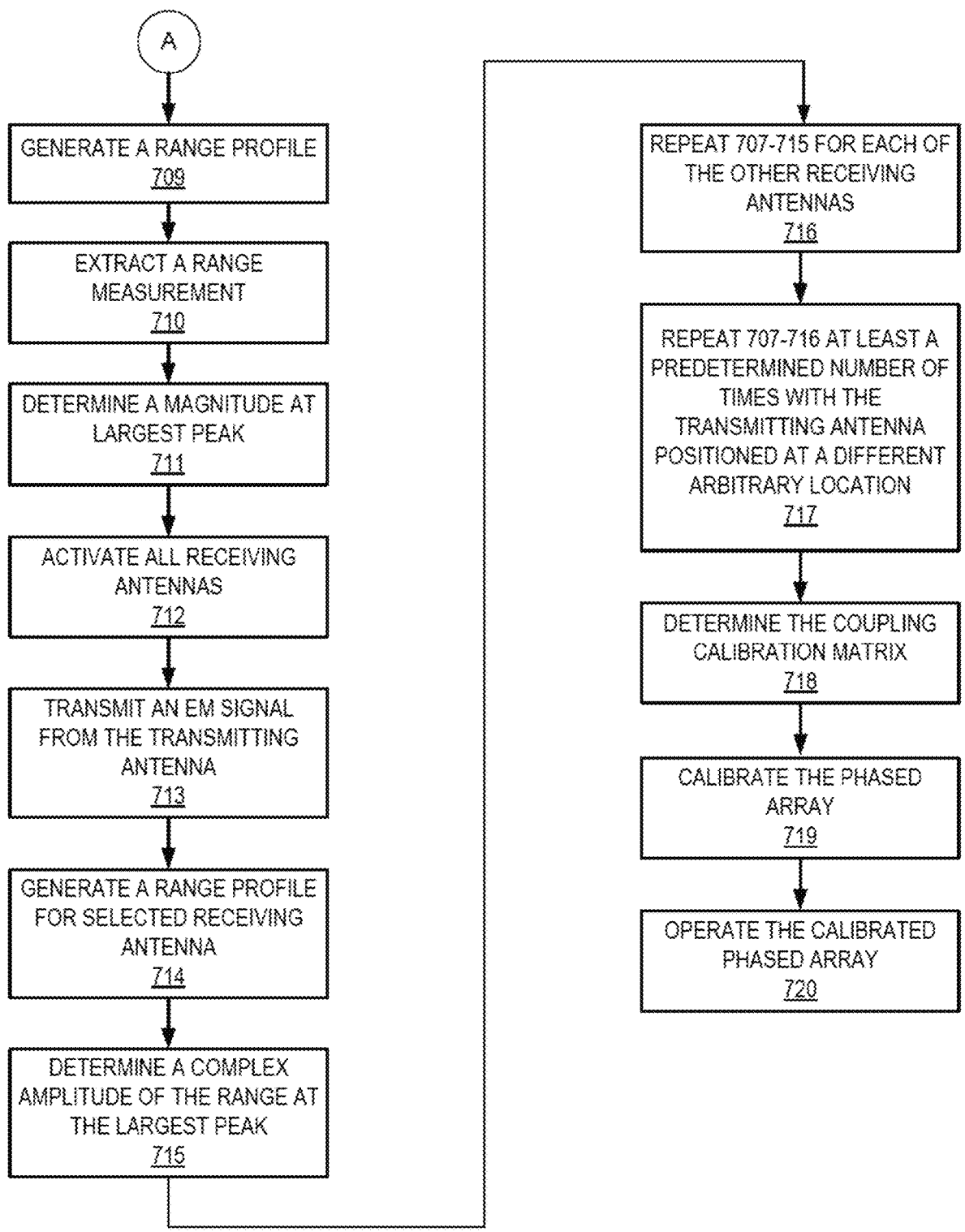

Referring to FIGS. 7A-7B, embodiments of the present disclosure provide a calibration procedure/method 700 that addresses each of these problems, and which does not require ultra-precise positioning of the transmitting antenna 106 relative to the receiving antennas 103a . . . 103k.

Figure 3:
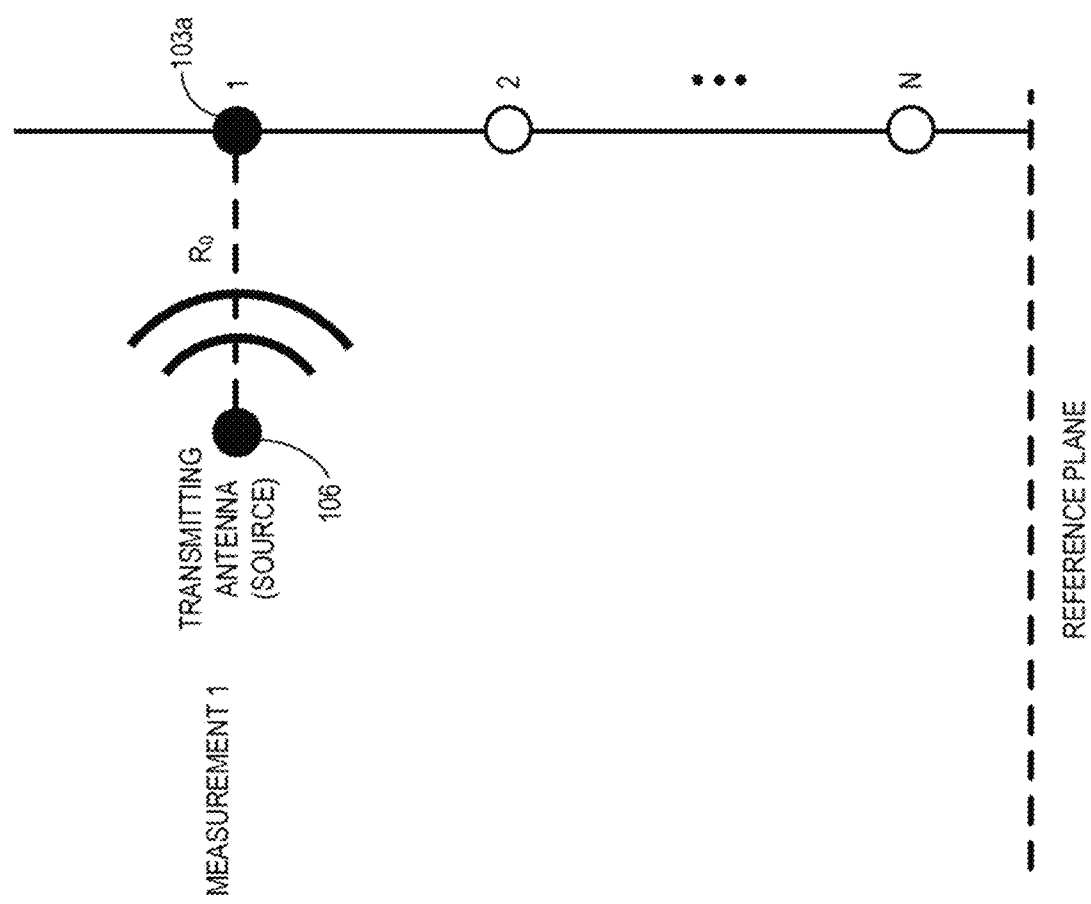
FIGS. 3-4 illustrate a pre-calibration process utilized to find a length mismatch correction vector.
Figure 4:
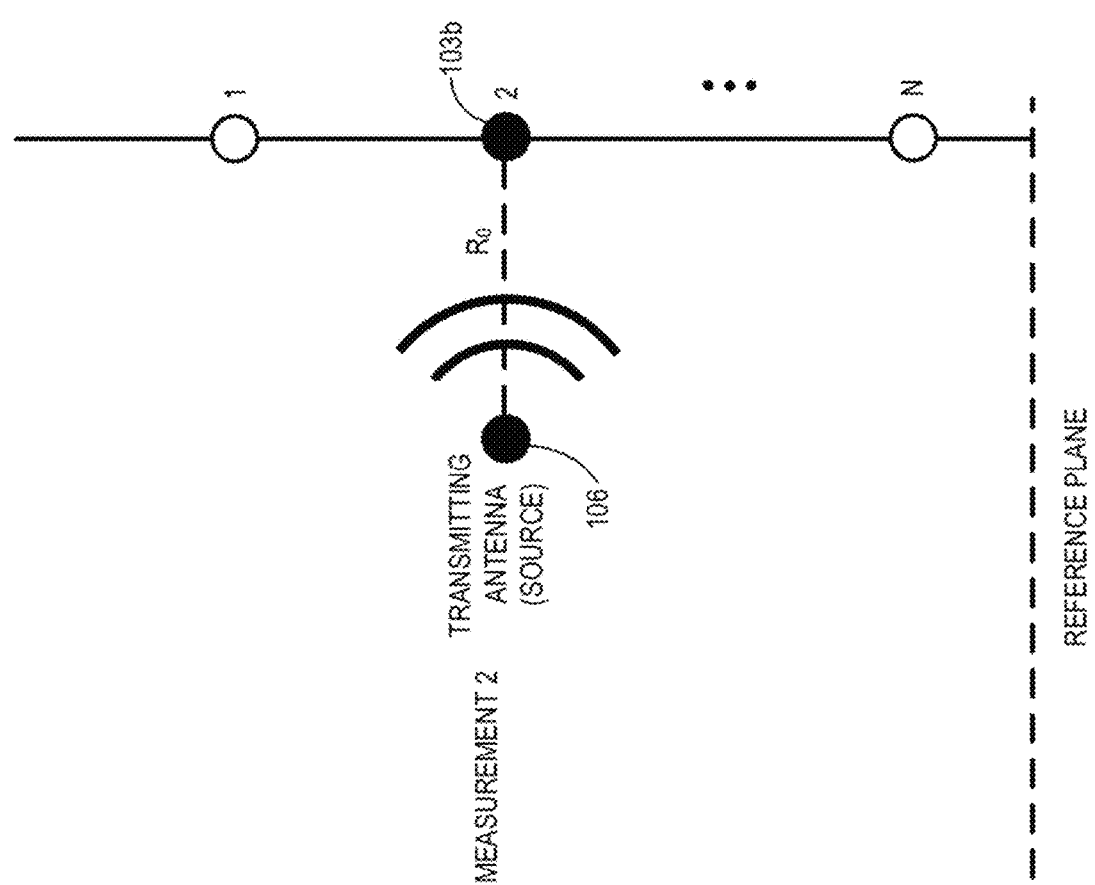

Referring to FIGS. 3-4 and 7A, a system and process is implemented to compensate each of the receiving antennas 103a . . . 103k-to-ADC channel path length mismatches, i.e., to compensate for the possible differences between the lengths of the signal paths for each receiver channel N measurements are utilized in order to determine the differences in the lengths of the signal paths for each of the N receiver channels. For each of the N measurements, the transmitting antenna 106 will be sequentially positioned in front of each receiving antenna at an arbitrarily selected distance $R_0$.

Referring to the process block 701, the transmitting antenna 106 is positioned at the distance, $R_0$, from one of the receiving antennas (e.g., the receiving antenna 103a), while every other receiving antenna (e.g., the receiving antennas 103b . . . 103k) are deactivated (e.g., disconnected, masked, or covered by an absorbent material, or any suitable means by which the receiving antenna is not permitted to convert a received EM signal to an RF signal). For example, masking with an absorbent material may be accomplished using a low permittivity dielectric tube or a sliding mechanism to cover the other antennas. It should be noted that disconnecting or masking/covering a receiving antenna does not necessarily require dismounting the entire phased array and its chassis/housing from its host device. Note that the amount of the selected distance $R_0$ does not need to be known, just that the same distance $R_0$ is used for each of the N measurements.

FIG. 3 schematically illustrates an example of generating a range profile between the transmitting antenna 106 and the receiving antenna 103a while deactivating the other receiving antennas, while FIG. 4 schematically illustrates an example of generating a range profile between the transmitting antenna 106 and the receiving antenna 103b while deactivating the other receiving antennas, and so forth for all of the N receiving antennas (deactivated receiving antennas are depicted with open circles). Referring to the process block 702, after the transmitting antenna 106 has been positioned the distance $R_0$ from the receiving antenna, the transmitting antenna 106 emits an EM signal towards the receiving antenna, which converts it to an RF signal, which is down converted by the respective mixer and then converted to a digital signal by the respective ADC. These digital signals are transferred to the data processing system 110 as described herein.

Referring to the process block 703, a process in the data processing system 110 generates a range profile on the digital signals from the ADC (e.g., by using an excessively zero-padded Fast Fourier Transform ("FFT")). As the distance $R_0$ is arbitrary and not necessarily known, but constant among all measurements, relative ranges are used. If the system uses transmitting and receiving antennas that are connected via a coaxial cable, this step can be easily accomplished using conductive measurements. The transmitting port of the phased array may be directly connected to each receiving port in order to obtain the channel trace length and gain compensation vectors as described herein. Nevertheless, knowing the distance $R_0$ is not relevant as long as it is the same for each of the measurements, so there is no need for measuring and determining the exact distance $R_0$. Such positioning of the transmitting antenna 106 relative to each receiving antenna 103a . . . 103k is easily performed considering that there are only 90-degree angles involved.

Referring to the process block 704, for every generated range profile, a peak detection is performed by a process running in the data processing system 110, and the range bin of the largest peak is saved. It is conventional that after performing the FFT, the samples are referred to as bins. The range may be extracted by first applying a global maximum detection on the magnitude of the range profile. The sample at which this maximum occurs is the desired range bin. Each FFT sample has an associated range to it, e.g., sample 1=1 meter, sample 2=2 meters, etc. By taking a large number of samples or by retaking the measurement and averaging, the range estimation error (caused by noise) can be made negligible, since taking a larger number of measurements or retaking measurements can improve the SNR, and thus improve the estimation. The gain of each receiver channel (absolute value of the peak, $P_k$) is also saved.

Referring to the process block 705, the process blocks 701-704 are repeated for each of the other receiving antennas 103b . . . 103k.

From all the extracted ranges, the range obtained from the receiving antenna 103a is subtracted (since the other receiver channels will be calibrated with respect to the receiver channel associated with the first receiving antenna 103a, though any of the receiving antennas 103a . . . 103k could be selected as the reference on which to calibrate the others), such that the channel trace length compensation vector takes the form as presented in Equation (3):

$$\hat{r} = [0, r_2 - r_1, \ldots, r_N - r_1]^T \quad (3)$$

where T denotes a transpose operation, i.e., converting a row vector into a column vector or vice versa. Note that the hat accent symbol used herein represents an estimate, and is used for the variables that model the system, e.g., channel trace length compensation vector estimates, channel gain compensation vector estimates, antenna pattern compensation vector estimates, and the coupling calibration matrix estimate, denoted as $\hat{r}$, $\hat{g}$, $\hat{A}$, $\hat{C}_{cal}$, respectively. These variables are designated as estimates since they are based on relative differences between the respective values for each of the receiver channels. For example, the channel trace length compensation vector $\hat{r}$ is a vector representing the differences in the receiver channel path lengths for each of the receiver channels relative to a reference receiver channel path length (which in this example is selected as the receiver channel, $r_1$, associated with the receiving antenna 103a). Note that this can be determined by the process running within the data processing system 110 since from each of the N measurements a peak can be determined, which is linearly dependent upon the range. Since the range for each of the N measurements includes the common distance $R_0$, the differences in the ranges is therefore a function of the different receiver channel path lengths associated with each of the receiving antennas 103a . . . 103k.

Referring to Equation (4), the saved gains are utilized by a process in the data processing system 110 to produce a channel gain compensation vector, as it is utilized for antenna pattern compensation as described herein (see Equation (7)):

$$\frac{1}{\hat{g}} = \left[1, \frac{P_1}{P_2}, \ldots, \frac{P_1}{P_N}\right] \quad (4)$$

The channel gain compensation vector $$, \frac{1}{\hat{g}},$$

is a vector representing the differences in the gain (ratio of peak values) between each of the receiver channels and the gain of the receiver channel associated with the receiving antenna 103a.

Figure 5:
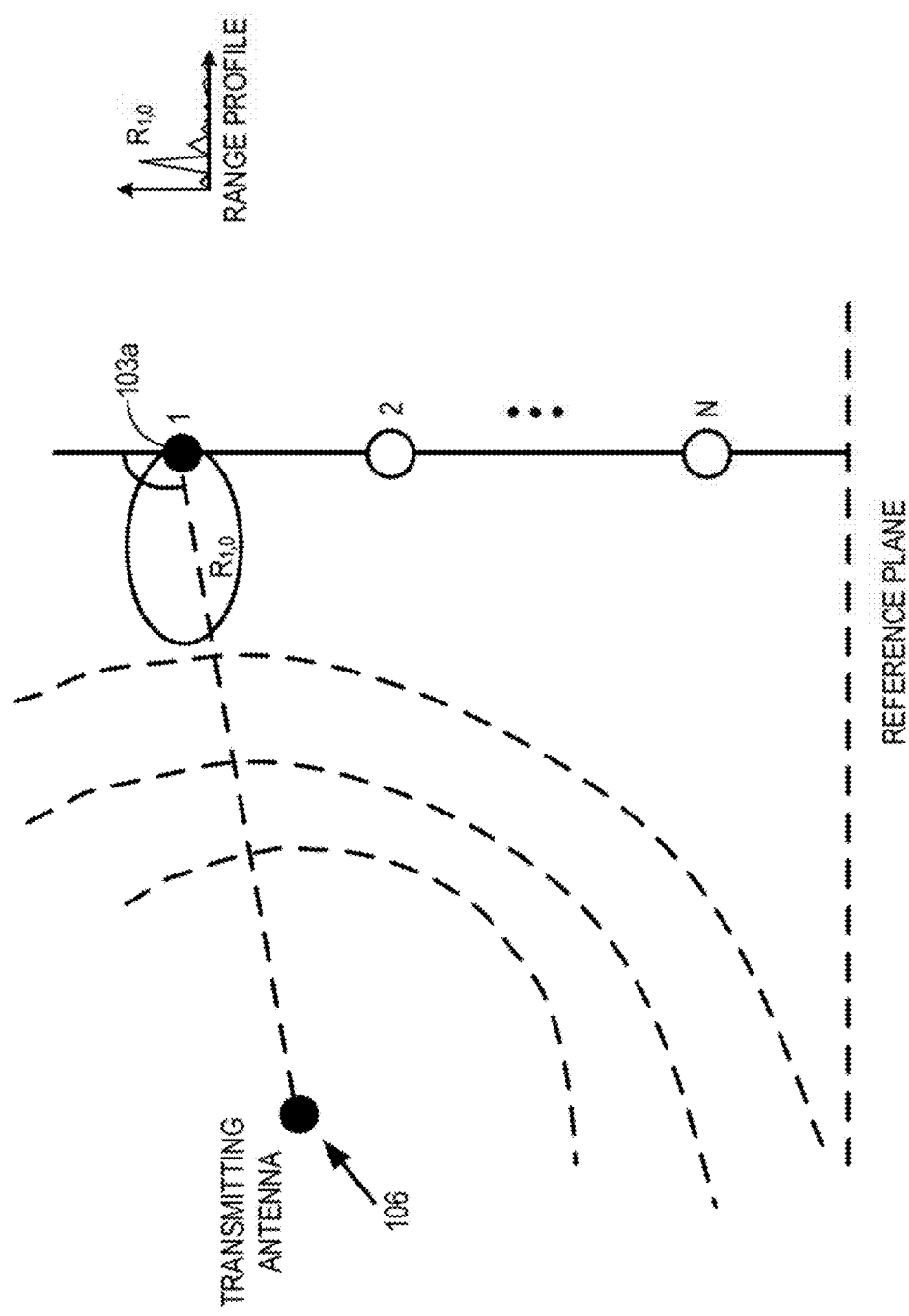
FIGS. 5-6 illustrate a calibration procedure in accordance with embodiments of the present disclosure.
Figure 6:
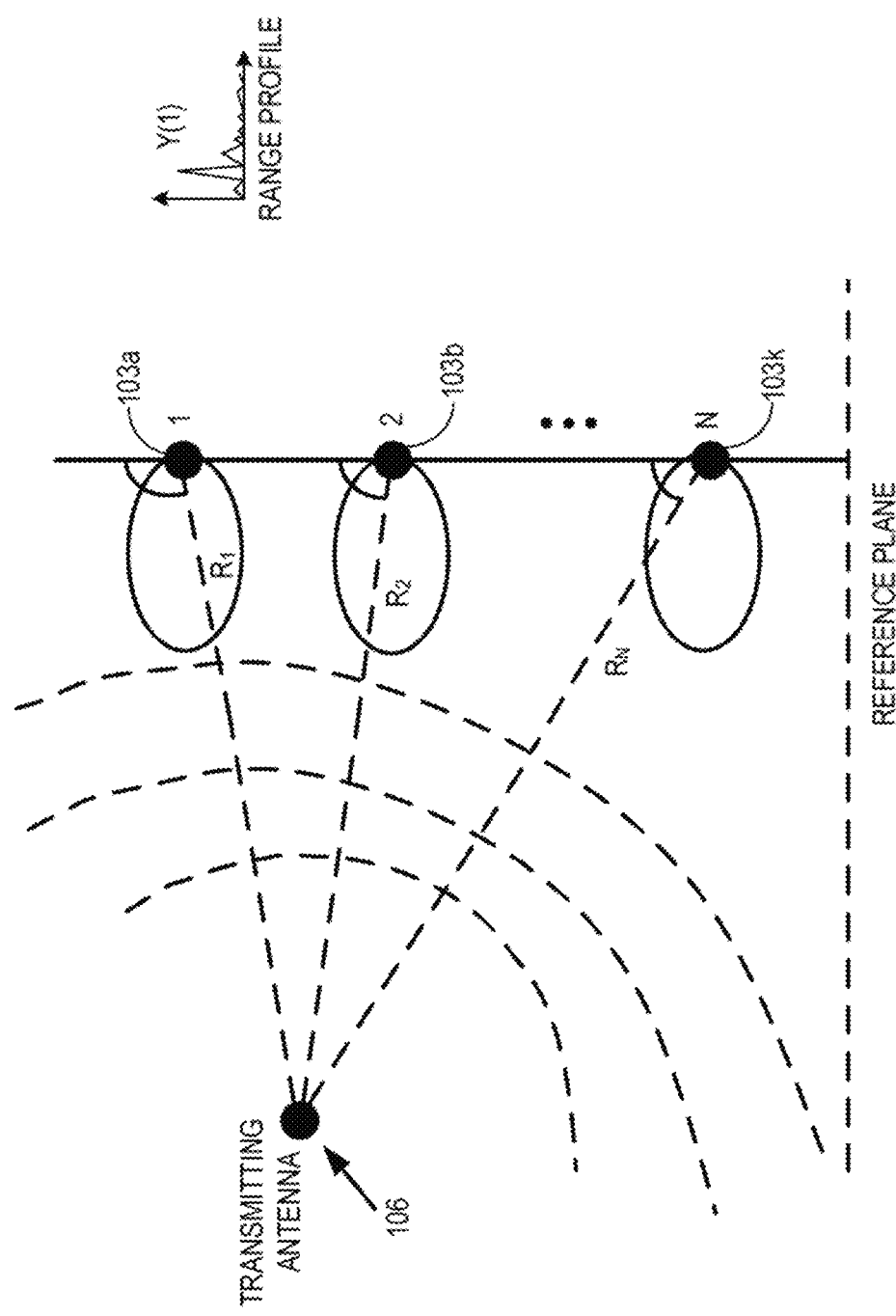

The next addressed issue is the coupling calibration matrix. It is not sufficient to place the transmitting antenna 106 at multiple angles relative to each of the receiving antennas 103a . . . 103k and generate a Least Squares Estimate. The reasoning is as follows. At receiving antenna 103a, a signal could be generated having a beat frequency proportional to the range $R_1$, and similarly for receiving antenna 103b, $R_2$. However, due to coupling, each signal will now have two (or more) components, and their summation will result in an offset of the peak, somewhere between the receiving antennas 103a and 103b. FIGS. 5-6 illustrate how this issue is handled by embodiments of the present disclosure.

Referring to FIGS. 5 and 7A-7B, in the process block 707, all of the receiving antennas but one (e.g., in FIG. 5, the receiving antenna 103a) are disconnected or masked/covered with an absorbent material, for an arbitrary position of the transmitting antenna 106. The transmitting antenna 106 may be oriented such that the entire array under test (i.e., the receiving antennas 103b . . . 103k) is illuminated by its main radiation beam, and is oriented to match the polarization of all the receiving antenna elements.

In the process block 709, a range profile is generated, and in the process block 710, the range at which the largest peak in the range profile is present is saved, denoted as $R_{1,0}$. In the process block 711, a magnitude of the peak is extracted from the range profile, denoted with $A_{1,0}$, which is the antenna pattern compensation vector used for antenna pattern compensation.

As illustrated in FIG. 6, in the process block 712, the previously disconnected/masked/covered receiving antennas (i.e., the receiving antennas 103b . . . 103k) are activated (e.g., reconnected/unmasked/uncovered). In the process block 713, the transmitting antenna 106 again transmits, a measurement is taken, and a range profile is generated in the process block 714. Instead of saving the range of the largest peak, in the process block 715, the complex amplitude is saved, as $y_1$, which represents the calibration measurement.

Referring to the process block 716, the process blocks 707-715 are repeated for all of the remaining receiving antennas 103b . . . 103k, such that the vectors presented in Equations (5)-(7) are completed:

$$R^{(1)} = [R_{1,0}, R_{2,0}, \ldots, R_{N,0}]^T - R_{1,0} \quad (5)$$

$$y^{(1)} = [y_1, y_2, \ldots, y_N]^T \quad (6)$$

$$A^{(1)} = [A_{1,0}, A_{2,0}, \ldots, A_{N,0}]^T \odot \frac{1}{\hat{g}} \quad (7)$$

For the vector $R^{(1)}$, $R_{1,0}$ is subtracted from all ranges, as only relative changes are relevant. Each receiving antenna channel will have an amplitude proportional to the transmitter-receiver antenna patterns between the transmitting antenna 106 and each receiving antenna 103a . . . 103k at a given angle. This can be accomplished without a priori knowing the pattern itself, and thus, the exact positioning of the transmitting antenna 106. Division by the channel gain compensation vector $\hat{g}$ is utilized to eliminate the effects of any differences in gain between the receiver channels, as it will be dealt with separately.

Referring to the process block 717, the transmitting antenna 106 is positioned at a different arbitrary location, and the process blocks 707-716 are repeated. The process block 717 may be performed at least M=2N times, such that the matrices presented in Equations (8)-(10) are obtained:

$$R = [R^{(1)}, R^{(2)}, \ldots, R^{(M)}] \quad (8)$$

$$Y = [y^{(1)}, y^{(2)}, \ldots, y^{(M)}] \quad (9)$$

$$\hat{A} = [A^{(1)}, A^{(2)}, \ldots, A^{(M)}] \frac{1}{\max([A^{(1)}, A^{(2)}, \ldots, A^{(M)}])} \quad (10)$$

As noted in Equation (10), the antenna pattern compensation matrix, $\hat{A}$, is normalized such that all scaling factors are smaller or equal to 1.

Having produced the channel trace length compensation vector $\hat{r}$, the range information of the measurements R, the channel gain compensation vector $\hat{g}$, the antenna pattern compensation matrix $\hat{A}$, and the calibration measurement matrix Y, the phased array 101 can be fully calibrated using the following procedure:

Firstly, processes within the data processing system 110 perform the calculations using Equations (11)-(16) to determine the coupling calibration matrix $\hat{C}_{cal}$. The range measurements R are corrected by subtracting the channel trace length compensation vector as presented in Equation (11):

$$R_{cor} = R - \hat{r} = [R^{(1)} - \hat{r}, \ldots, R^{(M)} - \hat{r}] \quad (11)$$

Next, the range-only dependent reference signal will be generated as presented in Equation (12):

$$X = \exp\left(2\pi j \frac{R_{cor}}{\lambda}\right) \quad (12)$$

The range-only dependent reference signal X only uses peak location (i.e., the x axis of a range profile), while the calibration measurement matrix Y only uses complex amplitude (i.e., the y axis of a range profile). Then, the antenna pattern compensation vector is accounted for as presented in Equation (13):

$$X_{cal} = X \odot \hat{A} \quad (13)$$

The antenna radiation pattern is embedded into the reference signal, to form $X_{cal}$ which is the ideal receive signal for the given phased array with non-isotropic elements.

It bears worth repeating that no information regarding the positioning of the transmitting antenna 106 is utilized in these calculations.

The calibration measurement matrix, Y, should only include information regarding the coupling. Because of this, trace mismatch and gain mismatch are eliminated as presented in Equation (14):

$$Y_{cal} = Y \odot \frac{1}{\hat{g}} \odot \exp\left(2\pi j \frac{-\hat{r}}{\lambda}\right) \quad (14)$$

Note that Y is an M×N matrix, $\hat{r}$ is a vector of length N, and $$\frac{1}{\hat{g}}$$

is a vector of length N. The element-wise division with the channel gain compensation vector $\hat{g}$ is utilized to eliminate gain discrepancy between channels. The second multiplication is utilized to compensate phase errors due to trace mismatch which are addressed separately from the coupling matrix C.

As both $Y_{cal}$ and $X_{cal}$ are full column rank matrices, the coupling matrix C may now be solved. Because $Y_{cal}$ and $X_{cal}$ are N×M matrices, with M>N, the system is now over determined. An optimal solution in the least squares ("LS") sense can be obtained by minimizing the LS error: $(Y_{cal} - CX_{cal})(Y_{cal} - CX_{cal})^H$. (Note that the superscript H is the Hermitian operator, which is equivalent to taking both the transpose and complex conjugate, denoted as superscript T and *, respectively.)

This may be performed by solving $$\frac{\partial (Y_{cal} - CX_{cal})(Y_{cal} - CX_{cal})^H}{\partial C} = 0,$$

which results in Equation (15):

$$C = Y_{cal} X_{cal}^H \left(X_{cal} X_{cal}^H\right)^{-1} \quad (15)$$

The coupling calibration matrix $\hat{C}_{cal}$ is defined as the inverse of the coupling matrix, C, as presented in Equation (16):

$$\hat{C}_{cal} = C^{-1} \quad (16)$$

Referring to the process block 719, range measurement algorithms of the phased array 101 are calibrated by providing the coupling calibration matrix $\hat{C}_{cal}$, the channel trace length compensation vector $\hat{r}$, and the channel gain compensation vector $\hat{g}$ to the processing unit 102. In the process block 720, while the phased array 101 is operated in a radar mode, real-time correction is performed on the signals received from each of the ADCs 105a . . . 105k as presented in Equation (17) before the processing unit 102 performs angle estimation processing:

$$x = \hat{C}_{cal}\left(z \odot \frac{1}{\hat{g}} \odot \exp\left(2\pi j \frac{-\hat{r}}{\lambda}\right)\right) \quad (17)$$

For example, the sampled data signals received from each of the ADCs 105a . . . 105k is range compressed to generate a range profile for every receiver channel. Such data may be organized in matrix form, having dimensions $N_s$ by N, where N is the number of receiver channels and $N_s$ is the number of samples in each range profile. The processing unit 102 can them perform the real-time correction by taking each length N vector, denoted as z, and apply it to Equation (17) for the correction. This is performed for each of the $N_s$ vectors. After the real-time correction is complete, Angle of Arrival estimation techniques, such as a Discrete Fourier Transform ("DFT"), may be applied on each vector z to produce the output of the phased array.

Recall that x represents ideal range measurements (i.e., the received range measurements output from each ADC 105a . . . 105k unaffected by antenna couplings, channel signal length mismatches, etc.). It can be seen in Equation (17) that there is no more antenna pattern compensation. This is due to the fact that the radar nominally operates in the far-field, such that all antennas essentially "see" the target at the same angle of arrival.

Experimental Example

Embodiments of the present disclosure are further illustrated by the following example, which is set forth to illustrate the presently disclosed subject matter and is not to be construed as limiting. The example describes testing carried out to confirm the ability of embodiments of the present disclosure to satisfactorily calibrate a phased array.

Consider the following example of a 77 GHz linear phased array composed of 4 receiving antennas (e.g., receiving antennas 103a, 103b, 103c, 103d) spaced apart from each other at 1.2λ, wherein the operating wavelength was λ=0.004, the chirp bandwidth was 2 GHz (~2%), and the chirp duration was 0.1 milliseconds. The number of measurements was 32, and the antennas were considered to be omnidirectional.

An exemplary coupling calibration matrix was artificially generated to include gain mismatches and asymmetric couplings between the receiving antennas:

$$C = \begin{bmatrix} 0.8 & -0.1j & 0 & 0 \\ -0.2j & 1 & 0.2 & 0 \\ 0 & 0.1 & 0.6 & 0.15j \\ 0 & 0 & -0.1 & 0.8 \end{bmatrix}$$

Exemplary channel trace mismatches were arbitrarily selected as:

$$\frac{r}{\lambda} = [1.3, 0.5, 0.7, 0.5]^T$$

Figure 8:
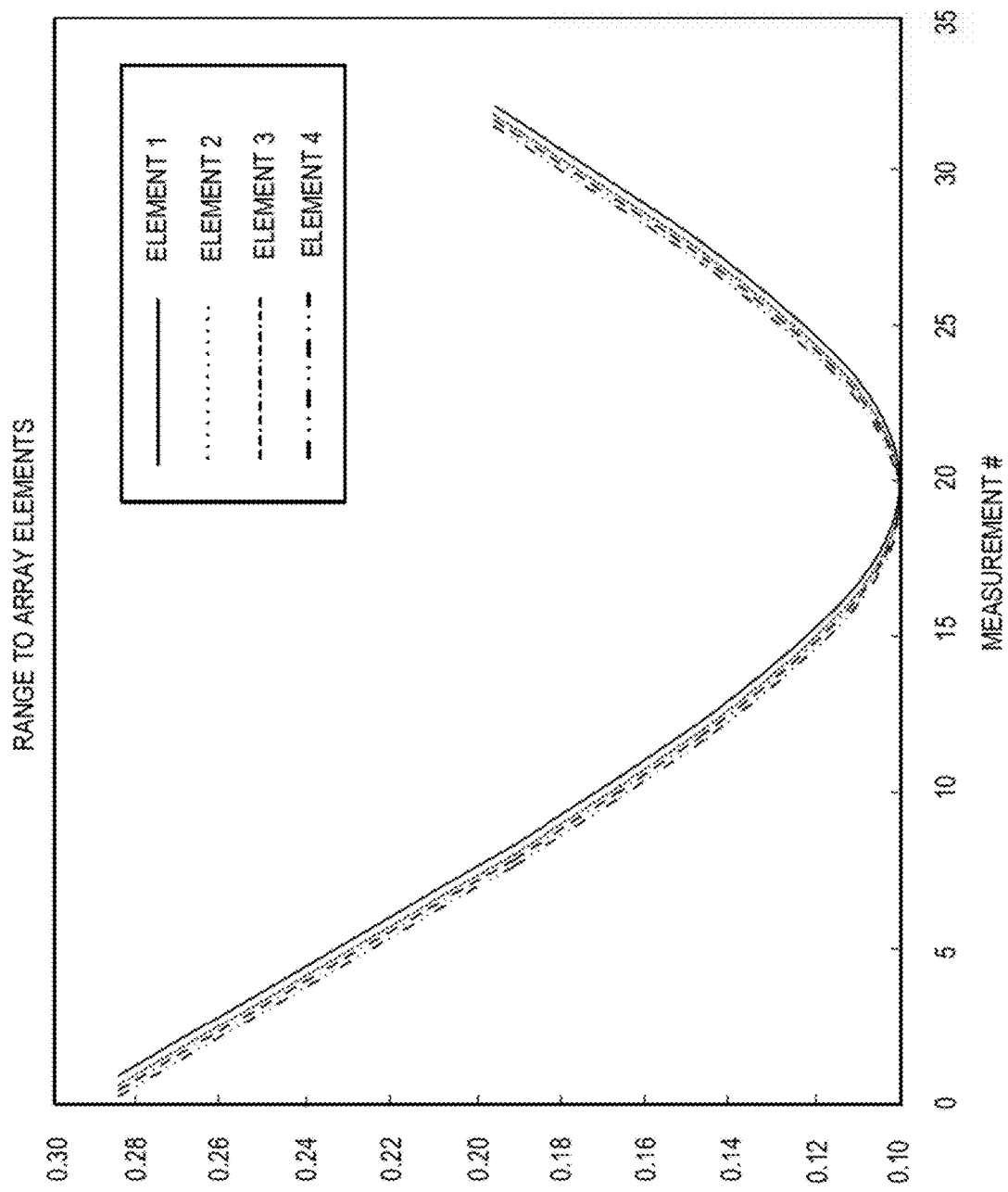
FIG. 8 illustrates range evolution during measurements between the transmitting antenna and each receiving antenna.

FIG. 8 illustrates the range variation between the transmitting antenna 106 and each receiving antenna (denoted as Elements 1-4 in FIG. 8) for the 32 measurements.

Figure 9:
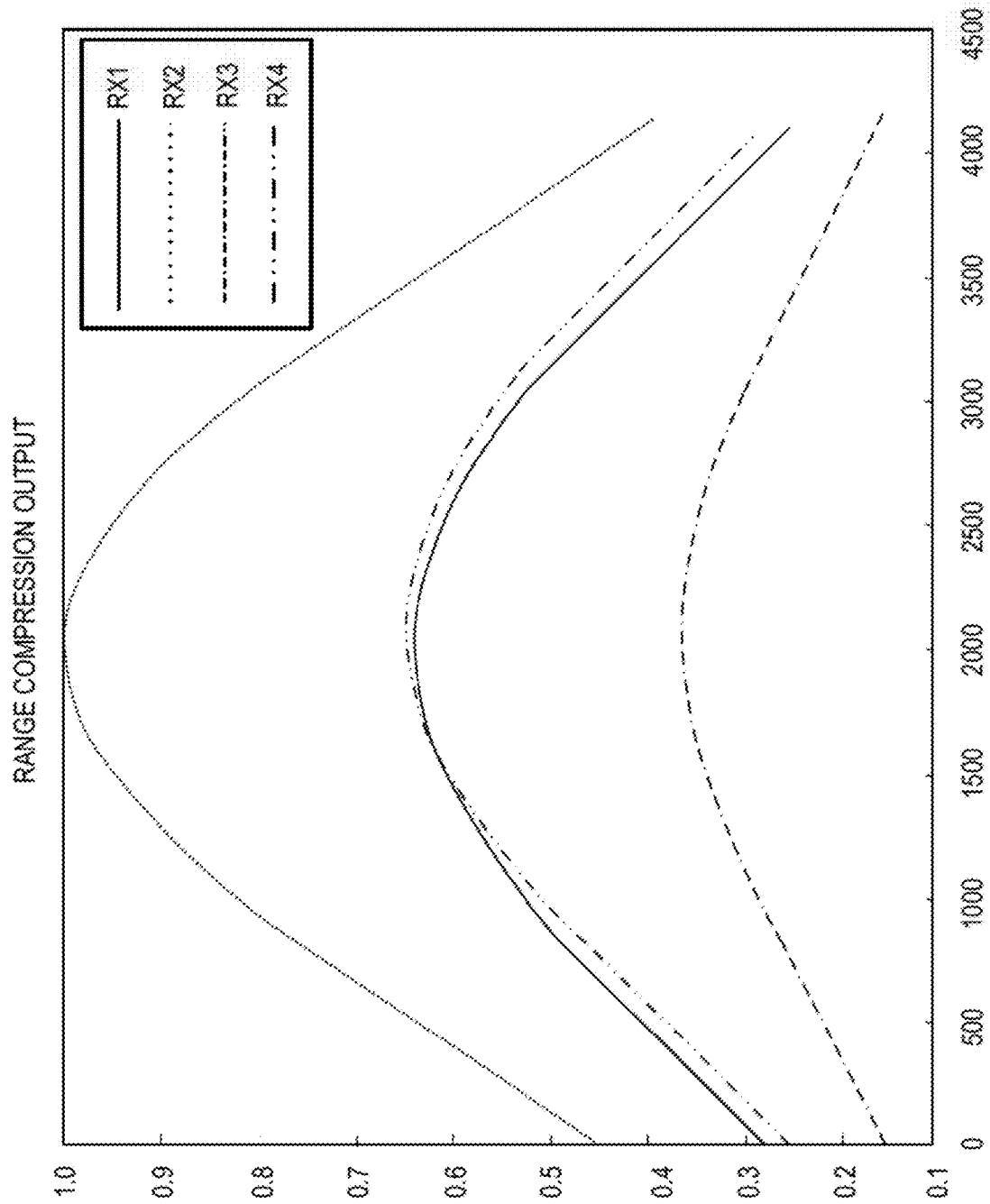
FIG. 9 illustrates a section of a range profile during far-field testing using an estimated coupling calibration matrix and channel trace length compensation vector.

FIG. 9 illustrates a magnified view of the normalized range profiles, when $2^{24}$ points were used for the FFT. The x axis represents frequency bins, not range.

Figure 10:
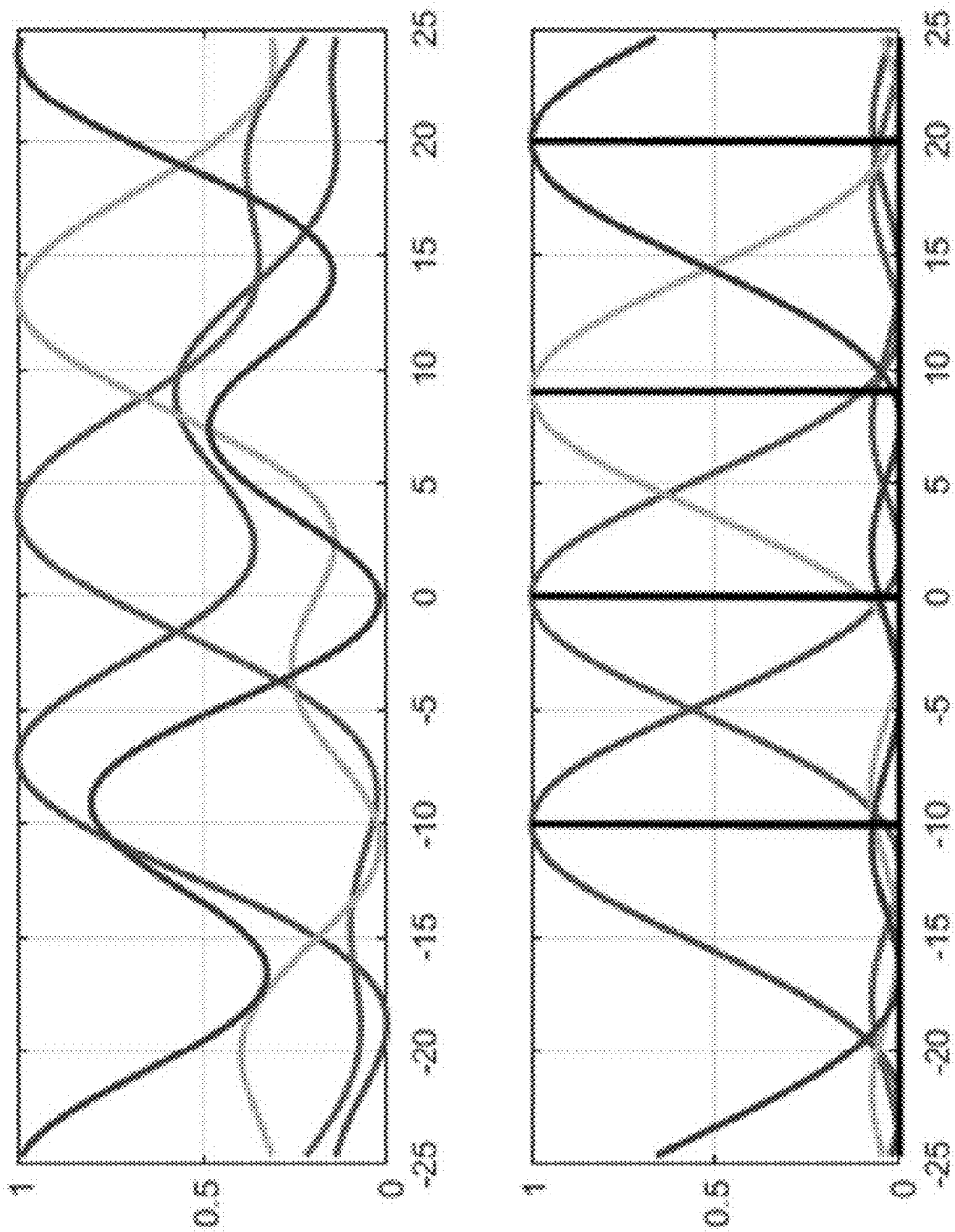
FIG. 10 illustrates angle estimation performance of an exemplary linear phased array without calibration (the upper plot), and angle estimation performance of the exemplary linear phased array with calibration (the lower plot).

FIG. 10 shows how well the calibration worked, for a far-field scenario. The upper plot illustrates operation of the phased array before calibration, while the lower plot illustrates operation of the phased array subsequent to being calibrated in accordance with embodiments of the present disclosure. Using the same 77 GHz linear phased array, a target was sequentially placed in the far-field, at −10, 0, 9, and 20 degrees. As indicated in the lower plot, the errors were below 0.01 degrees.

Embodiments of the present disclosure are also compatible with Software Defined Radio ("SDR") systems when there is an additional reference input channel Embodiments of the present disclosure are also compatible with systems that do not use a VCO. However, in such an instance, the system is operated as a pulsed radar.

In accordance with embodiments of the present disclosure, and as also described herein, processes performed within the data processing system 110 are configured to perform certain aspects of the calibration procedure described herein, including as described with respect to the process blocks of FIGS. 7A-7B and the Equations (1)-(17). As will be appreciated by one skilled in the art, aspects of the present disclosure may be embodied as a system, method, process, and/or program product. Accordingly, aspects of the present disclosure may take the form of an entirely hardware embodiment, an entirely software embodiment (including firmware, resident software, micro-code, etc.), or embodiments combining software and hardware aspects that may all generally be referred to herein as a "circuit," "circuitry," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing. More specific examples (a non-exhaustive list) of the computer readable storage medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowchart diagram and block diagrams in the figures illustrate architecture, functionality, and operation of possible implementations of systems, methods, processes, and program products according to various embodiments of the present disclosure. In this regard, each block in the flowchart diagram or block diagrams may represent a module, segment, or portion of code, which includes one or more executable program instructions for implementing the specified logical function(s) (e.g., Equations (1)-(17)). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors may, for instance, include one or more physical or logical blocks of computer instructions which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to a processor and/or controller of a general purpose computer, special purpose computer, or other programmable data processing apparatus (e.g., controller) to produce a machine, such that the instructions, which execute via the processor of the computer or other programmable data processing apparatus, create means for implementing the functions/acts specified in the flowchart and/or block diagram block or blocks.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. For example, a module may be implemented as a hardware circuit comprising custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

Computer program code, i.e., instructions, for carrying out operations for embodiments of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

These program instructions may also be stored in a computer readable storage medium that can direct a computer, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Reference may be made herein to "configuring" a device. It should be understood that this may include selecting predefined logic blocks and logically associating them, such that they provide particular logic functions, which includes monitoring or control functions. It may also include programming computer software-based logic of retrofit control device, wiring discrete hardware components, or a combination of any or all of the foregoing.

Reference throughout this specification to "one embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

Figure 11:
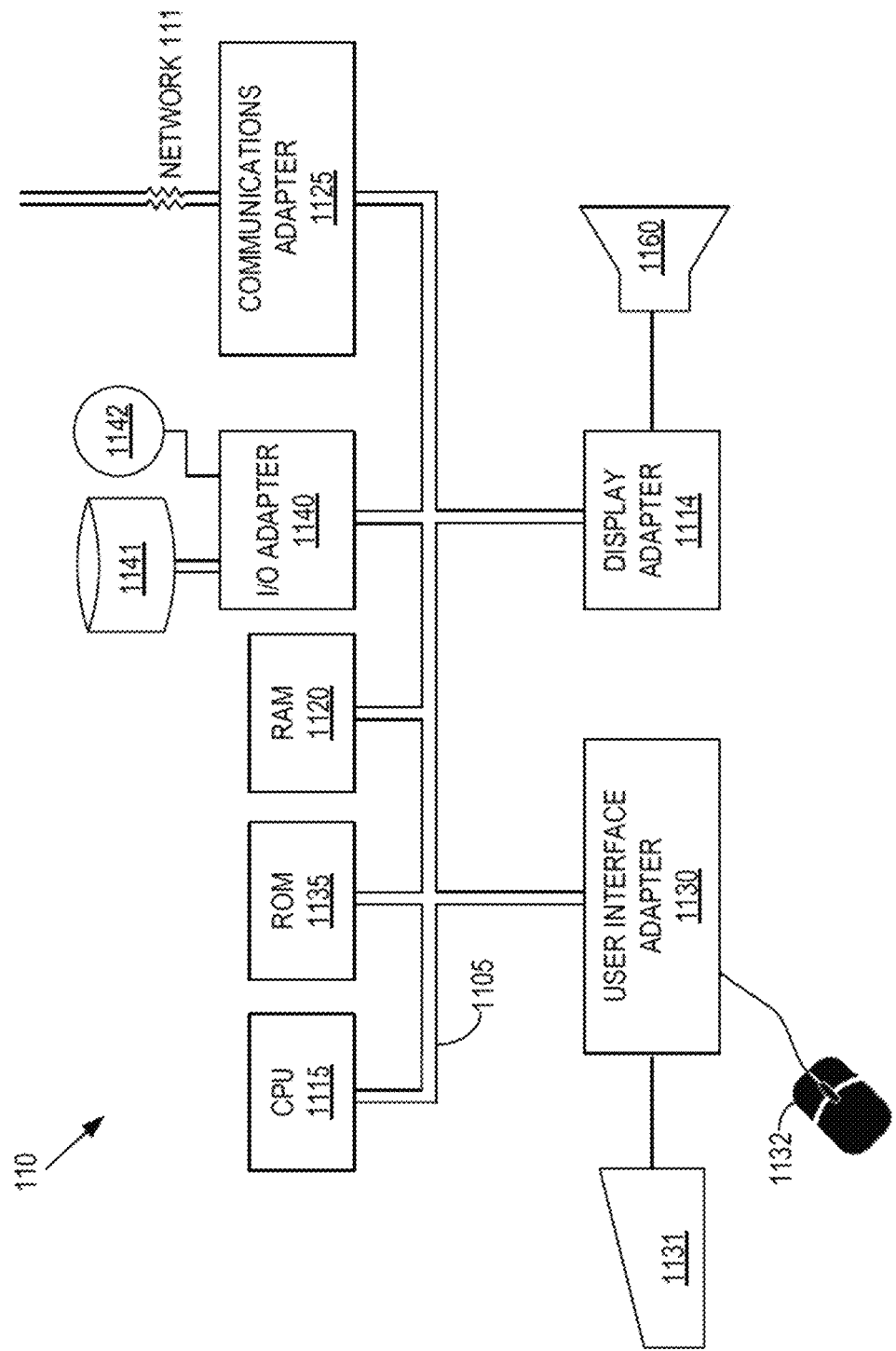
FIG. 11 illustrates a data processing system configured in accordance with embodiments of the present disclosure.

With reference now to FIG. 11, a block diagram illustrating a data processing system is depicted in which aspects of embodiments of the disclosure may be implemented. Data processing system 110 may employ a peripheral component interconnect ("PCI") local bus architecture. Although the depicted example employs a PCI bus, other bus architectures such as Accelerated Graphics Port ("AGP") and Industry Standard Architecture ("ISA") may be used, among others. Processor 1115, volatile memory 1120, and non-volatile memory 1135 may be connected to the local bus 1105 through a PCI Bridge (not shown). The PCI Bridge also may include an integrated memory controller and cache memory for processor 1115. Additional connections to the local bus 1105 may be made through direct component interconnection or through add-in boards. In the depicted example, a LAN adapter 1125, small data processing system interface ("SCSI") host bus adapter (not shown), and expansion bus interface (not shown) may be connected to the local bus 1105 by direct component connection. In contrast, an audio adapter (not shown), a graphics adapter (not shown), and a display adapter 1114 and display 1160 may be coupled to the local bus 1105 by add-in boards inserted into expansion slots. A user interface adapter 1130 may provide a connection for a keyboard 1131 and a mouse 1132. An I/O adapter 1140 may provide a connection for a hard disk drive 1141, a tape drive, and a CD-ROM/DVD drive 1142.

An operating system may be run on processor 1115 and used to coordinate and provide control of various components within the data processing system 110. The operating system may be a commercially available operating system. An object-oriented programming system such as Java may run in conjunction with the operating system and provide calls to the operating system from Java programs or programs executing on the system 110. Instructions for the operating system, the object-oriented operating system, and programs may be located on the non-volatile memory 1135 storage devices, such as the hard disk drive 1141, and may be loaded into the volatile memory 1120 for execution by the processor 1115.

Those of ordinary skill in the art will appreciate that the hardware in FIG. 11 may vary depending on the implementation. Other internal hardware or peripheral devices, such as flash ROM (or equivalent nonvolatile memory) or optical disk drives and the like, may be used in addition to or in place of the hardware depicted in FIG. 11. Also, the processes of the present disclosure may be applied to a multi-processor data processing system.

As another example, the data processing system 110 may be a stand-alone system configured to be bootable without relying on some type of network communication interface, whether or not the data processing system 110 includes some type of network communication interface. As a further example, the data processing system 110 may be an embedded controller, which is configured with ROM and/or flash ROM providing non-volatile memory storing operating system files or user-generated data.

The depicted example in FIG. 11 and above-described examples are not meant to imply architectural limitations. Further, a computer program form of the present disclosure may reside on any computer readable storage medium (i.e., floppy disk, compact disk, hard disk, tape, ROM, RAM, etc.) used by a data processing system. (The terms "computer," "system," and "data processing system" may be used interchangeably herein.)

Aspects of the present disclosure provide a method for calibrating a phased array including a plurality of receiving antennas, wherein the method includes (1) deactivating all but one of the plurality of receiving antennas; (2) positioning a transmitting antenna a selected distance in front of the receiving antenna that remains active; (3) transmitting an EM signal from the transmitting antenna towards the active receiving antenna; (4) generating a range profile associated with the active receiving antenna; (5) extracting a range measurement from the range profile; (6) repeating steps (1) through (5) for each of the other receiving antennas, wherein the transmitting antenna is positioned the selected distance in front of the active receiving antenna; (7) producing a channel trace length compensation vector and a channel gain compensation vector from the range measurements extracted in steps (1) through (6); (8) positioning the transmitting antenna at an arbitrarily selected location in front of the phased array; (9) deactivating all but one of the plurality of receiving antennas; (10) transmitting an EM signal from the transmitting antenna towards the phased array; (11) generating a range profile associated with the receiving antenna that remains active; (12) extracting a range measurement from the range profile generated in step (11); (13) determining a signal magnitude associated with the range measurement extracted in step (12); (14) activating all of the plurality of receiving antennas; (15) transmitting an EM signal from the transmitting antenna towards the phased array; (16) generating a range profile associated with the receiving antenna that was active during step (11); (17) determining a complex amplitude magnitude associated with the range profile generated in step (16); (18) repeating steps (8) through (17) for each of the other receiving antennas; (19) repeating steps (8) through (18) a predetermined number of times with the transmitting antenna each time positioned at a different arbitrarily selected location in front of the phased array; (20) producing an antenna pattern compensation vector from the determined signal magnitudes and a calibration measurement from the determined complex amplitude magnitudes; (21) producing a coupling calibration matrix as a function of the channel trace length compensation vector, the channel gain compensation vector, the antenna pattern compensation vector, the calibration measurement, and the range measurements extracted in step (12); and (22) calibrating range measurement algorithms of the phased array using the coupling calibration matrix, the channel trace length compensation vector, and the channel gain compensation vector. The method may further include operating the phased array with the calibrated range measurement algorithms. The phased array may be a linear phased array. In accordance with aspects of the present disclosure, a deactivated receiving antenna does not output an RF signal in response to receipt of an EM signal from the transmitting antenna. Deactivating a receiving antenna may include masking the receiving antenna so that it does not receive an EM signal from the transmitting antenna. The selected distance may be identical for each performance of step (2). The generating of a range profile may include performing a Fast Fourier Transform on a digitized version of an output of a down conversion mixer receiving an RF output from a receiving antenna and an RF signal provided to the transmitting antenna. The transmitting antenna may be positioned in a near field relative to the phased array.

Aspects of the present disclosure provide a method for calibrating a phased array that includes a plurality of receiving antennas, wherein the method includes (1) determining relative differences in receiver channel path lengths between each of the plurality of receiving antennas and their respective ADCs to produce a channel trace length compensation vector; (2) determining relative differences in gain between each of the plurality of receiving antennas and their respective ADCs to produce a channel gain compensation vector, wherein steps (1) and (2) are conducted by positioning a transmitting antenna an arbitrary but identical distance away in a near field from each of the plurality of receiving antennas to generate range profiles; (3) determining a coupling calibration matrix to calibrate for differences in couplings between the plurality of receiving antennas, wherein step (3) is conducted by positioning the transmitting antenna at multiple arbitrary locations in the near field to perform range profiles; and (4) performing real-time corrections on range measurements output from each of the ADCs utilizing the channel trace length compensation vector, the channel gain compensation vector, and the coupling calibration matrix. The generating of range profiles may include performing Fast Fourier Transforms on outputs of the ADCs. The determining of relative differences in receiver channel path lengths may include determining differences in receiver channel path lengths between a receiver channel of a selected one of the plurality of receiving antennas and receiver channels of each of the other plurality of receiving antennas, wherein the determining of relative differences in gain may include determining differences in gain between the receiver channel of the selected one of the plurality of receiving antennas and the receiver channels of each of the other plurality of receiving antennas. The determining of relative differences in receiver channel path lengths and the determining of relative differences in gain may include (a) deactivating all but one of the plurality of receiving antennas; (b) positioning the transmitting antenna the arbitrary but identical distance in front of the receiving antenna that remains active; (c) transmitting an EM signal from the transmitting antenna towards the active receiving antenna; (d) generating a range profile associated with the active receiving antenna; (e) extracting a range measurement from the range profile; (f) repeating steps (a) through (e) for each of the other receiving antennas, wherein the transmitting antenna is positioned the arbitrary but identical distance in front of the active receiving antenna; and (g) producing the channel trace length compensation vector and the channel gain compensation vector from the range measurements extracted in steps (a) through (f). In accordance with aspects of the present disclosure, a deactivated receiving antenna does not output an RF signal in response to receipt of an EM signal from the transmitting antenna. The determining of the coupling calibration matrix may include (a) positioning the transmitting antenna at a first arbitrarily selected location in the near field in front of the phased array; (b) deactivating all but one of the plurality of receiving antennas; (c) transmitting an EM signal from the transmitting antenna towards the phased array; (d) generating a range profile associated with the receiving antenna that remains active; (e) extracting a range measurement from the range profile generated in step (d); (f) determining a signal magnitude associated with the range measurement extracted in step (e); (g) activating all of the plurality of receiving antennas; (h) transmitting an EM signal from the transmitting antenna towards the phased array; (i) generating a range profile associated with the receiving antenna that was active during step (d); (j) determining a complex amplitude magnitude associated with the range profile generated in step (i); (k) repeating steps (a) through (j) for each of the other receiving antennas; (l) repeating steps (a) through (k) a predetermined number of times with the transmitting antenna each time positioned at a different arbitrarily selected location in front of the phased array; (m) producing an antenna pattern compensation vector from the determined signal magnitudes and a calibration measurement from the determined complex amplitude magnitudes; and (n) producing the coupling calibration matrix as a function of the channel trace length compensation vector, the channel gain compensation vector, the antenna pattern compensation vector, the calibration measurement, and the range measurements extracted in step (e). The deactivating of a receiving antenna may include masking the receiving antenna so that it does not receive an EM signal from the transmitting antenna.

Aspects of the present disclosure provide a data processing system that includes a processing device, a memory device coupled to the processing device, and logic instructions stored on the memory device that are executable to generate a first range profile associated with receipt of a first EM signal by a first receiving antenna of a phased array, wherein the first EM signal was transmitted from a transmitting antenna positioned a selected distance in front of the first receiving antenna, wherein a second receiving antenna of the phased array was deactivated; extract a first range measurement from the first range profile; generate a second range profile associated with receipt of a second EM signal by the second receiving antenna, wherein the second EM signal was transmitted from the transmitting antenna positioned the selected distance in front of the second receiving antenna, wherein the first receiving antenna was deactivated; extract a second range measurement from the second range profile; and produce a channel trace length compensation vector and a channel gain compensation vector from the first and second range measurements. The logic instructions stored on the memory device may be executable to generate a third range profile associated with receipt by the first receiving antenna of a third EM signal transmitted by the transmitting antenna positioned at a first arbitrarily selected location in front of the phased array, wherein the second receiving antenna is deactivated while the first receiving antenna remains active; extract a third range measurement from the third range profile; determine a first signal magnitude associated with the third range measurement; generate a fourth range profile associated with the first receiving antenna of a fourth EM signal transmitted by the transmitting antenna positioned at the first arbitrarily selected location in front of the phased array, wherein both the first and second receiving antennas are activated; determine a first complex amplitude magnitude associated with the fourth range profile; generate a fifth range profile associated with receipt by the second receiving antenna of a fifth EM signal transmitted by the transmitting antenna positioned at a second arbitrarily selected location in front of the phased array, wherein the first receiving antenna is deactivated while the second receiving antenna remains active; extract a fifth range measurement from the fifth range profile; determine a second signal magnitude associated with the fifth range measurement; generate a sixth range profile associated with receipt by the second receiving antenna of a sixth EM signal transmitted by the transmitting antenna positioned at the second arbitrarily selected location in front of the phased array, wherein both the first and second receiving antennas are activated; determine a second complex amplitude magnitude associated with the sixth range profile; produce an antenna pattern compensation vector from the first and second signal magnitudes and a calibration measurement from the first and second complex amplitude magnitudes; produce a coupling calibration matrix as a function of the channel trace length compensation vector, the channel gain compensation vector, the antenna pattern compensation vector, the calibration measurement, and the third and fourth range measurements; and calibrate range measurement algorithms of the phased array using the coupling calibration matrix, the channel trace length compensation vector, and the channel gain compensation vector. The phased array may be operated with the calibrated range measurement algorithms. In accordance with aspects of the present disclosure, a deactivated receiving antenna does not output an RF signal in response to receipt of an EM signal from the transmitting antenna. The transmitting antenna may be positioned in a near field relative to the phased array.

Reference may be made herein to a device, circuit, circuitry, system, or module "configured to" perform a particular function or functions. It should be understood that this may include selecting predefined logic blocks and logically associating them, such that they provide particular logic functions, which includes monitoring or control functions. It may also include programming computer software-based logic, wiring discrete hardware components, or a combination of any or all of the foregoing.

Reference throughout this specification to "an embodiment," "embodiments," "certain embodiments," "various embodiments," or similar language means that a particular feature, structure, or characteristic described in connection with the embodiments is included in at least one embodiment of the present disclosure. Thus, appearances of the phrases "in embodiments," "in an embodiment," "embodiments," "in certain embodiments," and similar language throughout this specification may, but do not necessarily, all refer to the same embodiment. Furthermore, the described features, structures, aspects, or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

The terminology used herein is for the purpose of describing particular embodiments and applications only and is not intended to be limiting of the disclosure. In the descriptions herein, numerous specific details are provided, such as examples of activities, circumstances, services, faults, errors, responses, reactions, processor activities, operations, events, mechanisms, software threads, cyberattacks, signals, or actions, programming, software modules, designer, manufacturer, or end user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, activities, circumstances, services, faults, errors, responses, reactions, processor activities, operations, events, mechanisms, software threads, cyberattacks, signals, and so forth. In other instances, well-known structures, materials, or operations may be not shown or described in detail to avoid obscuring aspects of the disclosure.

Benefits, advantages, and solutions to problems may have been described herein with regard to specific embodiments or applications. However, the benefits, advantages, solutions to problems, and any element(s) that may cause any benefit, advantage, or solution to occur or become more pronounced are not to be construed as critical, required, or essential features or elements of any or all the claims.

Those skilled in the art having read this disclosure will recognize that changes and modifications may be made to the embodiments without departing from the scope of the present disclosure. It should be appreciated that the particular implementations and applications shown and described herein may be illustrative of the disclosure and are not intended to otherwise limit the scope of the present disclosure in any way. Other variations may be within the scope of the following claims. Headings herein are not intended to limit the disclosure, embodiments of the disclosure, or other matter disclosed under the headings.

Herein, the term "or" may be intended to be inclusive, wherein "A or B" includes A or B and also includes both A and B. As used herein, the term "or" when used in the context of a listing of entities, refers to the entities being present singly or in combination. Thus, for example, the phrase "A, B, C, or D" includes A, B, C, and D individually, but also includes any and all combinations and subcombinations of A, B, C, and D. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the singular forms "a," "an," and "the" may be intended to include the plural forms as well, unless the context clearly indicates otherwise.

The corresponding structures, materials, acts, and equivalents of all means or step plus function elements in the claims may be intended to include any structure, material, or act for performing the function in combination with other claimed elements as specifically claimed.

What is claimed is:

1. A method for calibrating a phased array comprising a plurality of receiving antennas, the method comprising:
   (1) deactivating all but one of the plurality of receiving antennas;
   (2) positioning a transmitting antenna a selected distance in front of the receiving antenna that remains active;
   (3) transmitting an electromagnetic ("EM") signal from the transmitting antenna towards the active receiving antenna;
   (4) generating a range profile associated with the active receiving antenna;
   (5) extracting a range measurement from the range profile;
   (6) repeating steps (1) through (5) for each of the other receiving antennas, wherein the transmitting antenna is positioned the selected distance in front of the active receiving antenna;
   (7) producing a channel trace length compensation vector and a channel gain compensation vector from the range measurements extracted in steps (1) through (6);
   (8) positioning the transmitting antenna at an arbitrarily selected location in front of the phased array;
   (9) deactivating all but one of the plurality of receiving antennas;
   (10) transmitting an EM signal from the transmitting antenna towards the phased array;
   (11) generating a range profile associated with the receiving antenna that remains active;
   (12) extracting a range measurement from the range profile generated in step (11);
   (13) determining a signal magnitude associated with the range measurement extracted in step (12);
   (14) activating all of the plurality of receiving antennas;
   (15) transmitting an EM signal from the transmitting antenna towards the phased array;
   (16) generating a range profile associated with the receiving antenna that was active during step (11);
   (17) determining a complex amplitude magnitude associated with the range profile generated in step (16);
   (18) repeating steps (8) through (17) for each of the other receiving antennas;
   (19) repeating steps (8) through (18) a predetermined number of times with the transmitting antenna each time positioned at a different arbitrarily selected location in front of the phased array;
   (20) producing an antenna pattern compensation vector from the determined signal magnitudes and a calibration measurement from the determined complex amplitude magnitudes;
   (21) producing a coupling calibration matrix as a function of the channel trace length compensation vector, the channel gain compensation vector, the antenna pattern compensation vector, the calibration measurement, and the range measurements extracted in step (12); and
   (22) calibrating range measurement algorithms of the phased array using the coupling calibration matrix, the channel trace length compensation vector, and the channel gain compensation vector.

2. The method as recited in claim 1, further comprising operating the phased array with the calibrated range measurement algorithms.

3. The method as recited in claim 1, wherein the phased array is a linear phased array.

4. The method as recited in claim 1, wherein a deactivated receiving antenna does not output an RF signal in response to receipt of an EM signal from the transmitting antenna.

5. The method as recited in claim 4, wherein deactivating a receiving antenna comprises masking the receiving antenna so that it does not receive an EM signal from the transmitting antenna.

6. The method as recited in claim 1, wherein the selected distance is identical for each performance of step (2).

7. The method as recited in claim 1, wherein generating of a range profile comprises performing a Fast Fourier Transform on a digitized version of an output of a down conversion mixer receiving an RF output from a receiving antenna and an RF signal provided to the transmitting antenna.

8. The method as recited in claim 1, wherein the transmitting antenna is positioned in a near field relative to the phased array.

9. A method for calibrating a phased array comprising a plurality of receiving antennas, the method comprising:
(1) determining relative differences in receiver channel path lengths between each of the plurality of receiving antennas and their respective analog-to-digital converters ("ADCs") to produce a channel trace length compensation vector;
(2) determining relative differences in gain between each of the plurality of receiving antennas and their respective ADCs to produce a channel gain compensation vector,
wherein steps (1) and (2) are conducted by positioning a transmitting antenna an arbitrary but identical distance away in a near field from each of the plurality of receiving antennas to generate range profiles;
(3) determining a coupling calibration matrix to calibrate for differences in couplings between the plurality of receiving antennas, wherein step (3) is conducted by positioning the transmitting antenna at multiple arbitrary locations in the near field to perform range profiles; and
(4) performing real-time corrections on range measurements output from each of the ADCs utilizing the channel trace length compensation vector, the channel gain compensation vector, and the coupling calibration matrix.

10. The method as recited in claim 9, wherein generating of range profiles comprises performing Fast Fourier Transforms on outputs of the ADCs.

11. The method as recited in claim 9, wherein the determining of relative differences in receiver channel path lengths comprises determining differences in receiver channel path lengths between a receiver channel of a selected one of the plurality of receiving antennas and receiver channels of each of the other plurality of receiving antennas, and wherein the determining of relative differences in gain comprises determining differences in gain between the receiver channel of the selected one of the plurality of receiving antennas and the receiver channels of each of the other plurality of receiving antennas.

12. The method as recited in claim 9, wherein the determining relative differences in receiver channel path lengths and the determining relative differences in gain comprise:
(a) deactivating all but one of the plurality of receiving antennas;
(b) positioning the transmitting antenna the arbitrary but identical distance in front of the receiving antenna that remains active;
(c) transmitting an electromagnetic ("EM") signal from the transmitting antenna towards the active receiving antenna;
(d) generating a range profile associated with the active receiving antenna;
(e) extracting a range measurement from the range profile;
(f) repeating steps (a) through (e) for each of the other receiving antennas, wherein the transmitting antenna is positioned the arbitrary but identical distance in front of the active receiving antenna; and
(g) producing the channel trace length compensation vector and the channel gain compensation vector from the range measurements extracted in steps (a) through (f).

13. The method as recited in claim 12, wherein a deactivated receiving antenna does not output an RF signal in response to receipt of an EM signal from the transmitting antenna.

14. The method as recited in claim 9, wherein the determining the coupling calibration matrix comprises:
(a) positioning the transmitting antenna at a first arbitrarily selected location in the near field in front of the phased array;
(b) deactivating all but one of the plurality of receiving antennas;
(c) transmitting an EM signal from the transmitting antenna towards the phased array;
(d) generating a range profile associated with the receiving antenna that remains active;
(e) extracting a range measurement from the range profile generated in step (d);
(f) determining a signal magnitude associated with the range measurement extracted in step (e);
(g) activating all of the plurality of receiving antennas;
(h) transmitting an EM signal from the transmitting antenna towards the phased array;
(i) generating a range profile associated with the receiving antenna that was active during step (d);
(j) determining a complex amplitude magnitude associated with the range profile generated in step (i);
(k) repeating steps (a) through (j) for each of the other receiving antennas;
(l) repeating steps (a) through (k) a predetermined number of times with the transmitting antenna each time positioned at a different arbitrarily selected location in front of the phased array;
(m) producing an antenna pattern compensation vector from the determined signal magnitudes and a calibration measurement from the determined complex amplitude magnitudes; and
(n) producing the coupling calibration matrix as a function of the channel trace length compensation vector, the channel gain compensation vector, the antenna pattern compensation vector, the calibration measurement, and the range measurements extracted in step (e).

15. The method as recited in claim 14, wherein deactivating a receiving antenna comprises masking the receiving antenna so that it does not receive an EM signal from the transmitting antenna.

16. A data processing system comprising a processing device, a memory device coupled to the processing device, and logic instructions stored on the memory device that are executable to:
- generate a first range profile associated with receipt of a first electromagnetic ("EM") signal by a first receiving antenna of a phased array, wherein the first EM signal was transmitted from a transmitting antenna positioned a selected distance in front of the first receiving antenna, wherein a second receiving antenna of the phased array was deactivated;
- extract a first range measurement from the first range profile;
- generate a second range profile associated with receipt of a second EM signal by the second receiving antenna, wherein the second EM signal was transmitted from the transmitting antenna positioned the selected distance in front of the second receiving antenna, wherein the first receiving antenna was deactivated;
- extract a second range measurement from the second range profile; and
- produce a channel trace length compensation vector and a channel gain compensation vector from the first and second range measurements.

17. The system as recited in claim 16, wherein the logic instructions stored on the memory device are executable to:
- generate a third range profile associated with receipt by the first receiving antenna of a third EM signal transmitted by the transmitting antenna positioned at a first arbitrarily selected location in front of the phased array, wherein the second receiving antenna is deactivated while the first receiving antenna remains active;
- extract a third range measurement from the third range profile;
- determine a first signal magnitude associated with the third range measurement;
- generate a fourth range profile associated with the first receiving antenna of a fourth EM signal transmitted by the transmitting antenna positioned at the first arbitrarily selected location in front of the phased array, wherein both the first and second receiving antennas are activated;
- determine a first complex amplitude magnitude associated with the fourth range profile;
- generate a fifth range profile associated with receipt by the second receiving antenna of a fifth EM signal transmitted by the transmitting antenna positioned at a second arbitrarily selected location in front of the phased array, wherein the first receiving antenna is deactivated while the second receiving antenna remains active;
- extract a fifth range measurement from the fifth range profile;
- determine a second signal magnitude associated with the fifth range measurement;
- generate a sixth range profile associated with receipt by the second receiving antenna of a sixth EM signal transmitted by the transmitting antenna positioned at the second arbitrarily selected location in front of the phased array, wherein both the first and second receiving antennas are activated;
- determine a second complex amplitude magnitude associated with the sixth range profile;
- produce an antenna pattern compensation vector from the first and second signal magnitudes and a calibration measurement from the first and second complex amplitude magnitudes;
- produce a coupling calibration matrix as a function of the channel trace length compensation vector, the channel gain compensation vector, the antenna pattern compensation vector, the calibration measurement, and the third and fourth range measurements; and
- calibrate range measurement algorithms of the phased array using the coupling calibration matrix, the channel trace length compensation vector, and the channel gain compensation vector.

18. The system as recited in claim 17, wherein the phased array is operated with the calibrated range measurement algorithms.

19. The system as recited in claim 17, wherein a deactivated receiving antenna does not output an RF signal in response to receipt of an EM signal from the transmitting antenna.

20. The system as recited in claim 17, wherein the transmitting antenna is positioned in a near field relative to the phased array.

* * * * *